United States Patent [19]

King

[11] Patent Number: 4,571,808

[45] Date of Patent: Feb. 25, 1986

[54] RADIATOR HOSE SEPARATOR PLIERS CONSTRUCTION

[75] Inventor: Michael H. King, Kelowna, Canada

[73] Assignee: Lisle Corporation, Clarinda, Iowa

[21] Appl. No.: 586,417

[22] Filed: Mar. 5, 1984

[51] Int. Cl.[4] ........ B23P 19/04

[52] U.S. Cl. ........ 29/268; 81/302

[58] Field of Search ........ 29/237, 239, 268; 81/302

[56] References Cited

U.S. PATENT DOCUMENTS

| | | | |
|---|---|---|---|
| 3,309,764 | 3/1967 | Klatt | 29/239 |
| 3,357,085 | 12/1967 | Martin | 29/239 |
| 3,540,106 | 11/1970 | Goldman | 81/302 X |
| 3,911,583 | 10/1975 | Hoffman | 29/268 X |
| 4,486,937 | 12/1984 | Teramo | 29/268 |

*Primary Examiner*—James G. Smith

*Attorney, Agent, or Firm*—Allegretti, Newitt, Witcoff & McAndrews, Ltd.

[57] ABSTRACT

An improved tool for the removal of flexible tubing from pipe includes pivotally connected members which operate in the fashion of a pliers with the active end of the tool including V-shaped notches that are designed to engage and fit over metal tubing with one of the jaw members gripping the tubing while the other is designed to slide along the tubing and remove flexible tubing from the pipe.

2 Claims, 5 Drawing Figures

38
42
40

34
36
32

66
46
50
22
4
44
30
10
18
26
14
24
4
52
20
12
16
28

56
44
50
52
45
24
60
56
62
24

RADIATOR HOSE SEPARATOR PLIERS CONSTRUCTION

BACKGROUND OF THE INVENTION

This invention relates to a tool which is especially useful for the removal of a hose from a radiator pipe, for example, as used on the radiator of an internal combustion engine. The tool is designed primarily for use on vacuum and fuel lines.

Typically, an automobile internal combustion engine hose and other hoses are made from flexible rubber or composite material. Such hoses are generally fitted onto a metal tube or pipe such as an aluminum, steel or copper tube or pipe. Such hoses are then held in position by a clamp.

Periodically it is desirable to remove the flexible tubing from the metal pipe when servicing the internal combustion engine or when the tubing becomes defective or must be replaced. Removal of flexible tubing from a rigid pipe or tube is often a difficult job since various sealants or adhesives may adhere the tubing to the pipe. Thus, only with great difficulty can the tubing be removed. One way to remove the tubing has been by use of a knife to cut the tubing. Nonetheless, a more satisfactory and faster way of removing flexible tubing from metal pipe or the like has been sought.

SUMMARY OF THE INVENTION

In a principal aspect, the present invention relates to an improved tool especially useful for the removal of hose or flexible tubing from a solid rod or pipe. The tool is a pliers-like device having end handles which are manually operated, a middle connection or pivot, and working jaws that are substantially identical in shape and comprise opposed, generally planar surfaces having V-shaped openings that overly one another when the jaws are in the closed position. Each of the V-shaped jaws has a special surface. One of the jaws has a knife edge and the other jaw has a generally flat inside surface so that it will slide over the tube or pipe. The knife edge jaw may thus be frictionally fitted on the pipe or metal tube and rigidly grip the tube. The handles of the device or tool may then be operated to cause the other jaw to separate and engage against flexible tubing on the pipe to thereby remove or push that tubing from that pipe.

Thus, it is an object of the present invention to provide an improved tool for removing flexible hose or tubing from a generally hard surfaced pipe such as a metal pipe.

A further object of the present invention is to provide a flexible hose removing tool which is economical to manufacture, easy to use and which may be used in a variety of environments for a variety of applications.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figures 1, 2, 3, 4, 5:
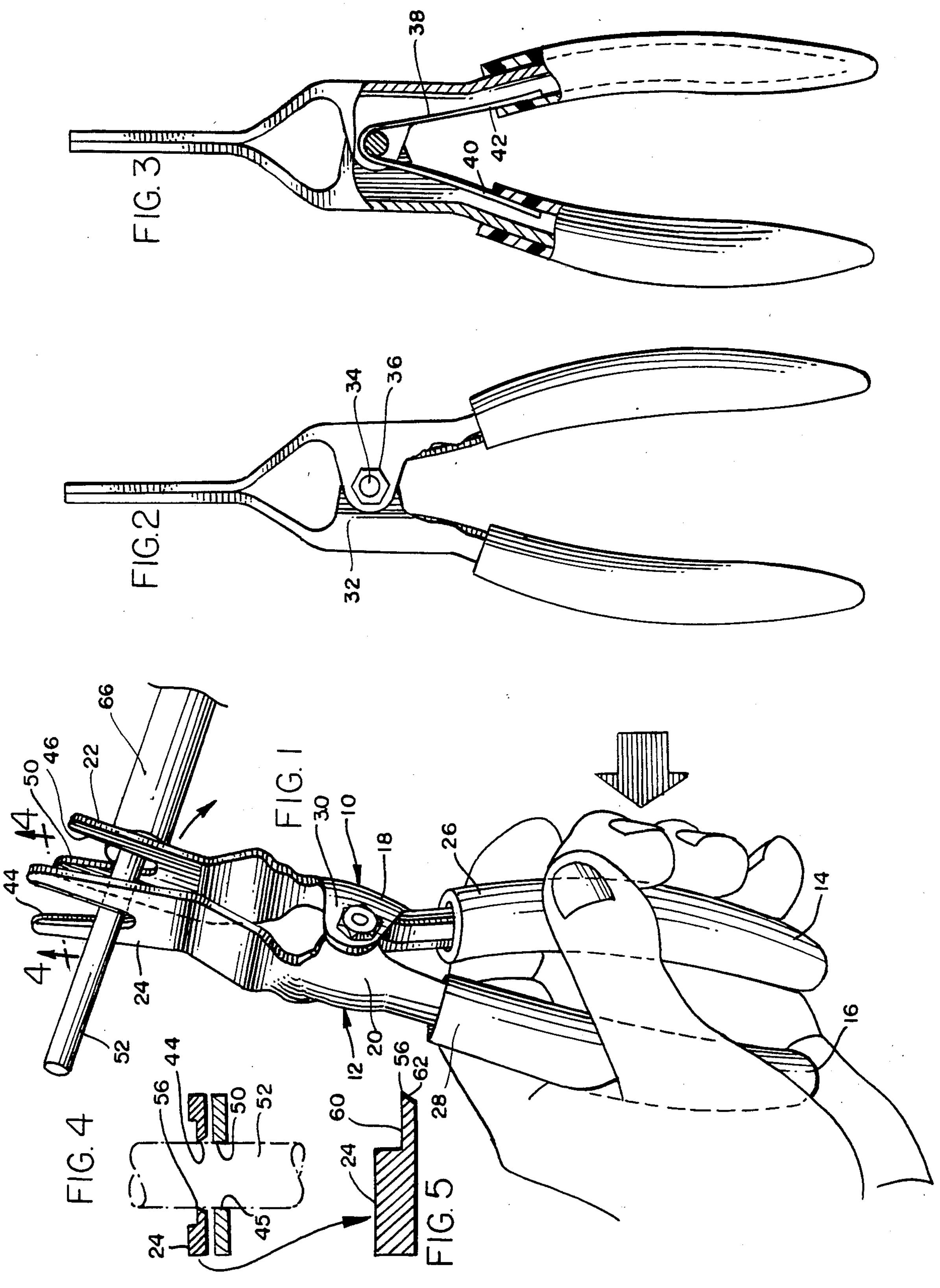
FIG. 1 is a perspective view illustrating the improved tool of the present invention and the manner in which it is to be used.
FIG. 2 is a plan view of the improved tool of the present invention.
FIG. 3 is a plan view similar to FIG. 2 with a partial cutaway view illustrating the internal construction of the tool.
FIG. 4 is an enlarged cross sectional view illustrating the construction of the jaws associated with the tool of the present invention.
FIG. 5 is an enlarged cross sectional view of one side of one of the jaws associated with the tool of the present invention.

Referring to the figures, particularly FIGS. 1-3, the tool of the present invention is illustrated. As shown in those figures, the tool has a pliers shape and is comprised of first and second members 10 and 12 which have substantially the same shape and size with minor differences to be described below. Thus, each member 10, 12 includes a handle end or handle portion 14, 16, respectively, an intermediate or pivot section 18, 20, respectively, and a jaw end 22, 24, respectively. Members 10, 12 are preferably fabricated from steel by a stamping process. The handle end 14, 16 of each member 10, 12 includes vinyl or rubber grips 26, 28, respectively, which are fitted over the ends 14, 16. The grips 26, 28 are generally cylindrical or hollow molded members so that they encircle the handle ends 14, 16 for a purpose to be described in greater detail below.

The member 10, and more particularly the pivot section 18 of the member 10, is defined by opposed flanges, one of which is depicted by the number 30. Likewise, the member 12 includes opposed flanges, for example, flange 32. The flanges 32 associated with the member 12 are spaced a distance which is slightly less than the distance of spacing associated with the flanges 30 of the member 10. In this manner, the flanges 32 may be fitted within the flanges 30 and a pivot pin 34, such as a headed bolt held in place by a screw 36, may be extended through appropriate openings in the flanges 30, 32 to define a pivot axis for the members 10, 12.

A leaf spring 38 which is formed in the shape of a hair pin fits over the pivot pin 34 and includes spaced arms 40, 42 which project into the hollow grips 26, 28 and are thus retained in position to bias the handle ends 14, 16 outwardly away from each other. The biasing spring 38 thus acts to normally maintain the jaw ends 22, 24 engaged in opposed, abutting relation to one another.

Each jaw end 22, 24 is a generally planar, flat sheet or plate which comprises an extension from the pivot sections 18, 20. The plane of the plates defined by the abutting jaw ends 22, 24 generally lies on the pivot axis defined by the pin 34. Opposed V-shaped notches 44, 46 of substantially identical size and shape are formed in each of the jaw ends 22, 24, respectively. Thus, when the jaw ends 22, 24 are biased to the position illustrated in FIGS. 2 and 3, the V-shaped notches 44, 46 will align over each other and define a substantially continuous opening through the jaw ends 22, 24.

The inside surface 50 of the notch 46 associated with a jaw end 22 is generally transverse to the plane defined by the jaw end 22. In this manner, the inside surface 50 will fit smoothly against a pipe or tube 52 as depicted in FIGS. 1 and 4. By contrast, the inside surface of notch 44 defines a knife edge 56 as depicted in FIGS. 1 and 4 as well as FIG. 5. The knife edge 56 is formed by stamping or pressing the metal which defines the notch 44 in such a manner that an edge 56 is formed which will grip or bite into the pipe or tubing 52.

The configuration of the knife edge 56 may be varied in accordance with need and desire. Preferably the knife edge 56 defines a dimension or outline which is the same size as or of a slightly lesser dimension than the shape defined by the planar surface 50. Preferably the knife edge 56 is formed so that the outside face 60 of the knife edge 56 is generally parallel to the surface of the jaw end 24. The other face 62 then forms an acute angle with the face 60 of the jaw end 24. The surface or face 60 is preferably positioned with respect to the jaw end 22 on the side opposite jaw end 22. This is depicted in more detail in FIG. 4.

When using the improved tool of the present invention, the tool is held so that the jaw ends 22, 24 are in the position depicted in FIGS. 2 and 3. The tool is then forced onto the tubing 52 so that the knife edge 56 will frictionally grip the tubing 52. The handles 14, 16 are then manually operated as depicted in FIG. 1. This causes the jaw end 22 to slide along the tubing 52 and engage with the flexible hose 66 thereby sliding the hose from the tubing 52.

As can be appreciated, the design of the pivot connection may be varied so that the members 10, 12 may cross over one another. It is also possible to design various shapes for the notches and knife edges which still comport with the general subject matter of the invention. The invention is therefore to be limited only by the following claims and their equivalents.

What is claimed is:

1. A plier-like tool for removing a flexible tubing from a pipe comprising, in combination:

a first and second plier member including first and second handle ends, first and second intermediate pivot sections, and first and second substantially planar jaw ends, respectively, said first and second substantially planar jaw ends having substantially identical size and shape;

a pivot connection for pivotally connecting said first and second plier members at said first and second intermediate pivot sections; and spring means for normally biasing said first and second handle ends apart and for normally biasing said first and second jaw ends together in an engaged relationship, said first and second jaw ends aligning, overlapping, and abutting in said engaged relationship;

said first jaw end having a first outside surface opposite said second jaw end and defining a gripping V-shaped opening extending substantially transverse to the direction of movement of said second jaw end in response to activation of said first and second handle ends during operation, said gripping V-shaped opening having a greater width adjacent a distal end thereof, said gripping V-shaped opening being defined by a first inside surface forming a pair of knife edges along said gripping V-shaped opening extending substantially from said distal end thereof, said first inside surface intersecting said first outside surface at an acute angle;

said second jaw end having a second outside surface opposite said first jaw end and defining a free V-shaped opening, said free V-shaped opening and said gripping V-shaped opening having substantially identical size and shape and aligning and overlapping in said engaged relationship, said free V-shaped opening being adapted to interpose said gripping V-shaped opening and said flexible tubing, to slide along said pipe, said handle ends so as to remove and to drivingly engage said flexible tubing upon actuation of said flexible tubing from said pipe.

2. A plier-like tool as claimed in claim 1 wherein said knife edges of said first jaw end define a slightly lesser dimension than and extend slightly into said free V-shaped opening of said second jaw end.

* * * * *